United States Patent [19]

Asanuma et al.

[11] Patent Number: 5,098,967

[45] Date of Patent: Mar. 24, 1992

[54] METHOD OF CONTROLLING THE MOLECULAR WEIGHT OF POLYPROPYLENE

[75] Inventors: Tadashi Asanuma; Ichiro Fujio; Nobutaka Uchikawa, all of Takaishi, Japan

[73] Assignee: Mitsui Toatsu Chemicals, Incorporated, Tokyo, Japan

[21] Appl. No.: 258,052

[22] Filed: Oct. 17, 1988

Related U.S. Application Data

[63] Continuation of Ser. No. 943,786, Dec. 19, 1986, abandoned.

[51] Int. Cl.$^5$ .......................... C08F 2/02; C08F 10/06
[52] U.S. Cl. ........................... 526/60; 526/59; 526/902; 526/905
[58] Field of Search .................. 526/59, 60, 905, 902

[56] References Cited

U.S. PATENT DOCUMENTS

| | | | |
|---|---|---|---|
| 3,146,223 | 8/1964 | Cheney | 526/59 |
| 3,758,446 | 9/1973 | Coughlin et al. | 526/905 X |
| 4,469,853 | 9/1984 | Mori | 526/59 |

FOREIGN PATENT DOCUMENTS 1081409  4/1986  Japan .................. 526/905

OTHER PUBLICATIONS

Translation of Jap. Kokai Pat. Pub. No. 57-168904, published Oct. 18, 1982, to Asanuma et al., CA(105):153719c (1986).

*Primary Examiner*—Fred Teskin
*Attorney, Agent, or Firm*—Oblon, Spivak, McClelland, Maier & Neustadt

[57] ABSTRACT

Disclosed herein is a method for controlling the molecular weight of a propylene homo- or co-polymer at a constant level upon subjecting propylene alone or a mixture of propylene and another α-olefin copolymerizable with propylene as a monomer or monomer mixture to bulk polymerization in the presence of hydrogen as a molecular weight modifier in a reaction tank equipped with a reflux condenser. According to the present invention, it is possible to prepare continuously a propylene homo- or copolymer, the molecular weight of which is controlled at a desired level, by measuring moment by moment the quantity of heat removed from the reaction tank, calculating the amount of the monomer or monomer mixture polymerized in the reaction tank based on the thus-calculated quantity, determining in advance the relationship between molecular weights and the volumes of hydrogen consumption required per unit amounts of corresponding polypropylene homo- or co-polymers, calculating the volume of hydrogen which is to be introduced into the reaction tank so as to obtain polypropylene of a desired molecular weight from the above relationship and the above-calculated polymerized amount, and charging hydrogen into the reaction tank in accordance with the above-calculated volume of hydrogen which varies from time to time.

4 Claims, 3 Drawing Sheets

METHOD OF CONTROLLING THE MOLECULAR WEIGHT OF POLYPROPYLENE

This is a continuation of application Ser. No. 06/943,786, filed on Dec. 19, 1986, now abandoned.

TECHNICAL FIELD

This invention relates to a process of the homo- or co-polymerization of propylene. Specifically, the present invention relates to a method for controlling the molecular weight of a propylene homo- or co-polymer which is obtained by subjecting propylene alone or a mixture of propylene and another $\alpha$-olefin copolymerizable with propylene to bulk polymerization in the presence of hydrogen as a molecular weight modifier in a reaction tank equipped with a reflux condenser while using the propylene or mixture itself as a liquid medium too.

PRIOR ART

It has been well-known that upon polymerization of propylene in the presence of a Ziegler-Natta catalyst, the molecular weight of the resulting polypropylene can be controlled by adjusting the volume of hydrogen to be added during the polymerization [see, for example, J. Polymer Sci., C2, 109 (1974)]. Since there is a certain close relationship between the concentrations of hydrogen in vapor phases and the molecular weights of the resulting polypropylenes [see, for example, J. Polymer Sci., Part AI, Vol. 8, 2717 (1970)], polypropylene is usually prepared by controlling the concentration of hydrogen in a vapor phase at a constant level so that the molecular weight of the resulting polypropylene has a desired value.

When polypropylene is prepared by bulk polymerization in a large reaction tank, it is difficult to remove the polymerization heat if the removal of heat is effected merely through the wall of the reaction tank or by means of a heat exchanger provided inside the reaction tank. Accordingly, it has also been known to use a reflux condenser which makes use of the latent heat of a liquid medium.

When polypropylene is subjected to bulk polymerization in a reaction tank equipped with the above-mentioned reflux condenser, the concentration of hydrogen in a vapor phase however varies significantly in accordance with the load to the reflux condenser. It is therefore necessary to repeat the introduction or discharge of hydrogen frequently into or out of the reaction tank in order to maintain the concentration of hydrogen at a constant level in the vapor phase, that is, to control the molecular weight of the resulting polymer. This means that a great deal of hydrogen is discharged and moreover, a large volume of propylene is also discharged along with the thus-discharged hydrogen, resulting in a problem that the above process is not preferred economically.

SUMMARY OF THE INVENTION

The present inventors have carried out an extensive investigation with a view toward providing a solution to the above-described problems. The investigation has now resulted in the finding of a process which allows to adjust, with good controllability, the molecular weight of polypropylene without loss of hydrogen and/or propylene, leading to completion of this invention.

An object of this invention is therefore to provide a process for the preparation of a propylene homo- or co-polymer of a controlled molecular weight without loss of raw materials.

In one aspect of this invention, there is thus provided a process for the preparation of a propylene homo- or co-polymer by subjecting propylene alone or a mixture of propylene and another $\alpha$-olefin copolymerizable with propylene as a monomer or monomer mixture to bulk polymerization at a constant temperature in the presence of hydrogen as a molecular weight modifier in a reaction tank equipped with a reflux condenser while using the propylene or mixture itself as a liquid medium too and condensing vapor of the medium in the reflux condenser so as to remove at least a part of polymerization heat. The process comprises:

measuring and calculating the quantity of polymerization reaction heat generated in the reaction tank, and calculating the amount of the monomer or monomer mixture polymerized in the reaction tank based on the thus-calculated quantity;

determining in advance the relationship between molecular weights and the volumes of hydrogen consumption required for the molecular weights with respect to the propylene homo- or co-polymer;

determining the volume of hydrogen consumption required per unit amount of propylene alone or the mixture of said another $\alpha$-olefin copolymerizable with propylene corresponding to a desired molecular weight of the propylene homo- or co-polymer; and reacting the monomer or monomer mixture while controlling the volume of hydrogen, which is to be fed into the reaction tank, in accordance with variations in the volume of hydrogen required in the reaction tank as a product of the volume of the required hydrogen consumption and the above-calculated amount of the monomer or monomer mixture.

Figure 1:
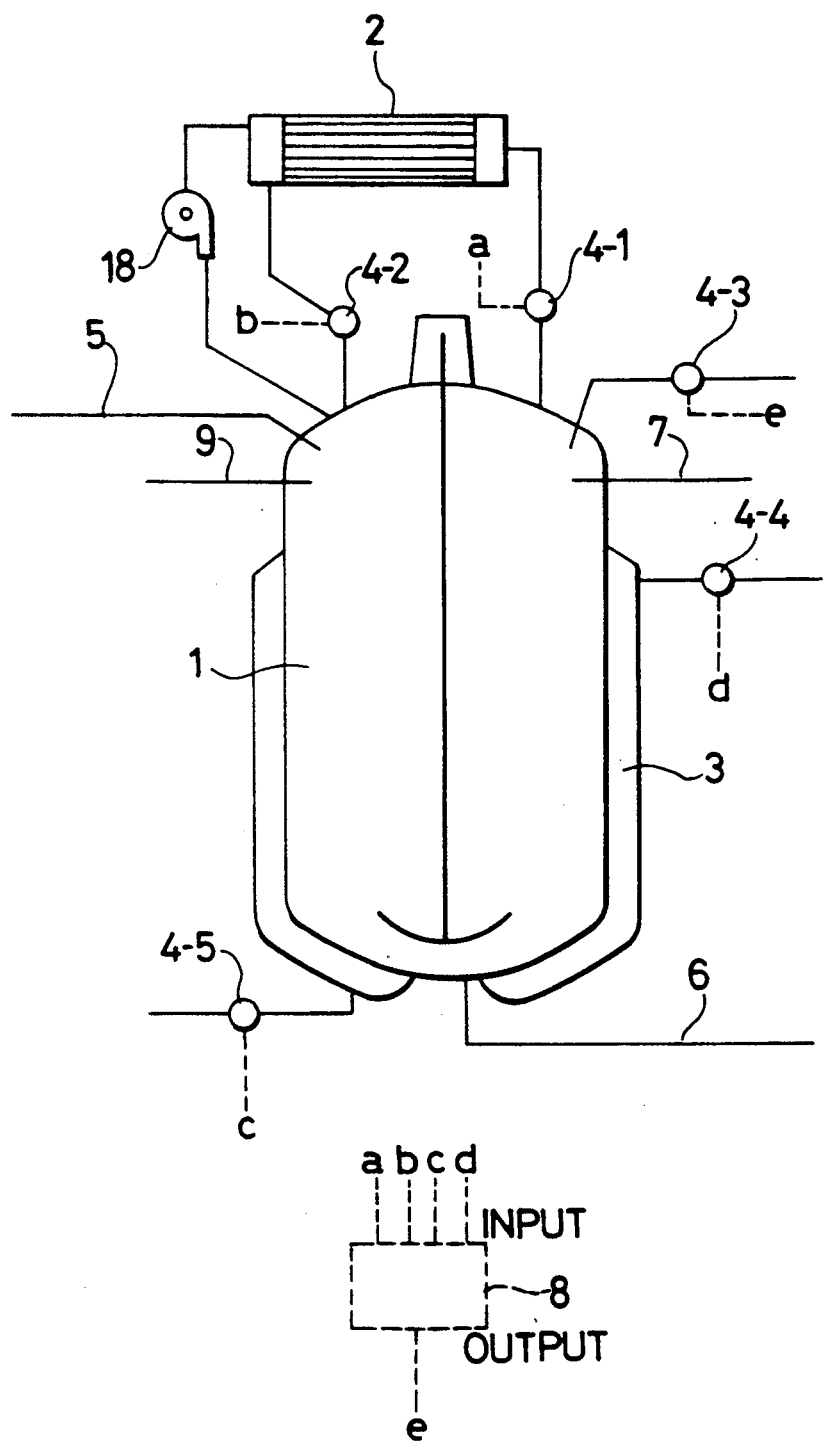
FIG. 1 shows one example of an apparatus suitable for use in the practice of the process of this invention.

BEST MODE FOR CARRYING OUT THE INVENTION AND DETAILED DESCRIPTION OF THE INVENTION

The term "another $\alpha$-olefin copolymerizable with propylene" as used herein means at least one of ethylene, butene-1, hexene-1, etc. and may also be called "copolymerizable $\alpha$-olefin" hereinafter. When a propylene copolymer is prepared in accordance with the process of this invention, no particular limitation is imposed on the amount of the copolymerizable $\alpha$-olefin so long as the resulting polypropylene remains in a slurry state. However, the upper limit of the proportion of the copolymerizable $\alpha$-olefin other than propylene in each resulting polymer may generally be about 40 wt. % or so. For the sake of convenience in describing the present invention, the term "propylene" as used in the descriptive portion of the present specification other than the Examples should be interpreted to include not only propylene alone but also a mixture of propylene and another α-olefin copolymerizable with propylene. Correspondingly, the term "polypropylene" as used in the descriptive portion of the present specification other than the Examples means not only propylene homopolymer but also the copolymer of the mixture.

For the following reasons, the process of this invention finds extremely important utility when propylene is polymerized in the presence of hydrogen as a molecular weight modifier in a reaction tank equipped with a reflux condenser.

In a reaction tank having no reflux condenser, the vapor phase and liquid phase are maintained in vapor-liquid equilibrium and moreover, the vapor phase is in a substantially even state. Therefore, the concentration of hydrogen in the vapor phase can be accurately determined if the gas of the vapor phase is sampled and its hydrogen concentration is measured. It is hence possible to control the molecular weight of the resulting polypropylene by comparing the thus-detected hydrogen concentration with a desired hydrogen concentration by conventionally-known desired comparator means and on the basis of the results of the comparison, by automatically controlling a feed valve of hydrogen to the reaction tank and thus always introducing a deficient volume of hydrogen into the reaction vessel so as to maintain the concentration of hydrogen in the vapor phase substantially at a constant level.

However, the vapor phase and liquid phase are not always maintained in vapor-liquid equilibrium when a polymerization is conducted by using a reaction vessel equipped with a reflux condenser. In addition, the concentration of hydrogen in the vapor phase varies considerably depending on the load to the reflux condenser along the passage of time as mentioned above. As a result, it is impossible to control the molecular weight of the resulting polypropylene if a simple automatic controlling method such as that referred to above is relied upon.

As exemplary polymerization catalysts useful in the practice of this invention, may be mentioned catalyst systems composed of conventionally-known transition metal catalysts and organometallic compounds. One or more stereoregularity improvers may also be used in combination if necessary or desirable. Although not limited specifically to the following exemplary polymerization catalysts, illustrative of the polymerization catalyst may include titanium trichloride obtained by reducing titanium tetrachloride with a reducing agent such as aluminum; organoaluminum or organomagnesium, those obtained by subjecting titanium trichloride to activation treatments such as its treatments with oxygen-containing organic compounds, titanium tetrachloride and the like subsequent to its grinding; those formed of titanium trichloride or titanium tetrachloride supported on carriers such as magnesium chloride; etc. As exemplary organometallic compounds, may be mentioned organoaluminums such as trialkylaluminums, dialkylaluminum halides, alkylaluminum sesquihalides and alkylaluminum dihalides and organomagnesiums such as dialkylmagnesiums.

One embodiment of the present invention will hereinafter be described with reference to the accompanying drawings.

FIG. 1 illustrates one example of an apparatus suitable for use in the practice of the process of this invention, in which there are illustrated an agitatorequipped reaction tank 1, a reflux condenser 2 in the form of a horizontal shell-and-tube heat exchanger, a jacket 3 for the reaction tank 1 and an inlet line 5 for the introduction of a slurry into the reaction tank 1. Where the reaction tank 1 is employed for single-tank polymerization or is used as the first tank upon polymerization in a plurality of tanks connected in series, the inlet line 5 is used for the introduction of a catalyst slurry. Where the reaction tank 1 is the second or subsequent tank in such series reaction tanks, the inlet line 5 is employed for the introduction of a reaction slurry from the preceding reaction tank. There are also shown a discharge line 6 for the removal of a slurry from the reaction tank 1, a charge line 7 for the introduction of propylene and a catalyst, a sampling line 9 for the collection of gas from the vapor phase of the reaction tank 1, and a blower 18 adapted to recycle to the reaction tank 1 uncondensed gas which has not been condensed in the reflux condenser 2 and is composed principally of hydrogen gas. Also illustrated are a detector 4-1 for the flow velocity and temperature of gas at the entrance to the reflux condenser 2, another detector 4-2 for the flow velocity and temperature of a condensate returning to the reaction tank 1 subsequent to its recovery in the reflux condenser 2, a flow rate regulating valve 4-3 for hydrogen gas to be introduced into the reaction tank 1, a further detector 4-4 for the flow velocity and temperature of cooling (or heating) water leaving the jacket 3, a still further detector 4-5 for the flow rate and temperature of cooling (or heating) water to be introduced into the jacket 3.

The following procedure may be followed by way of example in order to calculate the amount of a monomer or monomer mixture polymerized per unit time in the reaction tank 1. Data signals a,b,c,d, which have been output from the detectors 4-1,4-2,4-4,4-5 respectively, are input to a data processor 8, where the quantity of heat generated per unit time in the reaction tank 1 at the time of output of the data signals is calculated by correcting the quantity of heat removed per the same unit time from the reaction tank 1, which has been calculated from the data signals a,b,c,d, in accordance with the quantity of dissipated heat which has been calculated based on the overall structure of the polymerization system and its operational conditions. Since the relationship between polymerized amount of the monomer or monomer mixture and reaction heat can be known from the composition of the thus-polymerized monomer or monomer mixture in the manner known per se in the art, the above-mentioned generated heat is converted further at the data processor 8 into the amount of the monomer or monomer mixture polymerized per unit time in the reaction tank 1.

Figure 2:
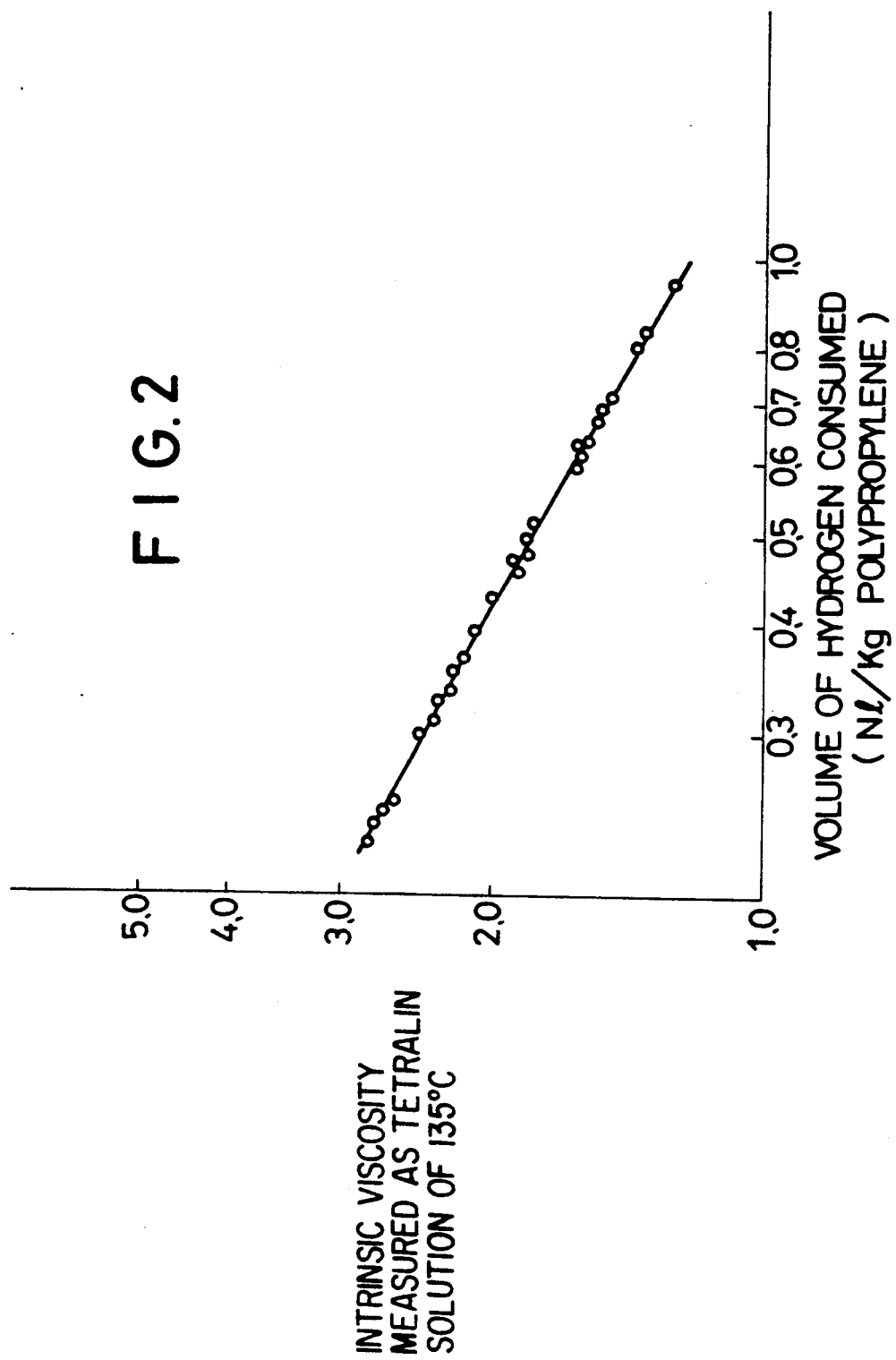
FIG. 2 is a diagrammatic representation of the relationship between the volume of hydrogen consumed in an exemplary polymerization process at a constant temperature and the intrinsic viscosity of the resulting polymer measured as its tetralin solution.

Incidentally, the relationship between the molecular weight of polypropylene of a desired composition and the volume of hydrogen required for the preparation of the polypropylene varies in accordance with catalyst system, polymerization temperature and the like, but as shown in FIG. 2 by way of example, the relationship between the intrinsic viscosity of a polymer as measured in the form of its tetralin solution of 135° C. and the volume of hydrogen consumption per unit weight of the polymer can be predetermined.

It is therefore possible to determine the volume of hydrogen required per unit amount of feed propylene by storing beforehand the above relational expression as an equation in the data processor 8 and then inputting a desired polypropylene molecular weight in the data processor 8.

In the above-described manner, the volume of hydrogen required in the reaction tank 1 is hence calculated at the data processor 8 as the product of the amount of the polymerized monomer or monomer mixture, which has been calculated in advance, and the volume of hydrogen required for the unit amount of the feed polypropylene. Results of the operation are output as a signal e from the data processor 8. It is therefore possible to replenish the volume of consumed hydrogen by changing the opening degree of the flow rate regulating valve for hydrogen gas in accordance with variations in the value of the signal e so as to control the volume of hydrogen to be introduced into the reaction tank 1, that is, to conduct the reaction while maintaining the actual concentration of hydrogen in the reaction tank 1 substantially at a constant level. Accordingly, it seems to be possible to prepare polypropylene of a uniform molecular weight.

By the way, when the present invention is applied to such a reaction system that a plurality of tanks are connected in series to conduct continuous polymerization therein and the molecular weight of the resulting polymer is increased successively from one tank to the next tank, hydrogen is introduced and discharged from each of the tanks along with the slurries which are introduced through the line 5 and discharged through the line 6 respectively and contains said hydrogen dissolved therein. It is hence necessary to input information on the volume of the hydrogen in the data processor 8 and to perform a correction on the basis of the information.

On the other hand, when a single-tank polymerization process is effected in the above-described reaction tank 1 or a polymerization process is conducted by connecting in series a plurality of reaction tanks, each, of the same type as the reaction tank 1, each of the reaction tanks has already been filled with a great deal of propylene not only as a liquid medium but also as a reaction raw material at the start-up time of the reaction. It is therefore impossible to obtain a polymer of a desired molecular weight even if hydrogen is fed in accordance with the present invention, namely, in a volume corresponding to the amount of polymerized propylene which is calculated based on the measured and calculated quantity of heat of the polymerization reaction. While taking into consideration the volume of hydrogen to be dissolved in the liquid propylene filled in each reaction tank at the start-up time and the volume of the vapor phase above the liquid medium, it is thus necessary to charge at once hydrogen in a volume corresponding to the liquid propylene at the beginning so that the polymerization reaction is conducted. The molecular weight of the resulting polypropylene is then measured and compared with a desired value. Based on the results of the comparison, a small amount of hydrogen or propylene is additionally charged in the reaction tank. The above-described fine correction procedure is repeated until the molecular weight of the resulting polypropylene reaches the desired value. The reaction is thereafter allowed to proceed further in accordance with this invention, whereby polypropylene of a constant molecular weight can be prepared.

It is a reaction tank equipped with a reflux condenser that can be used in the practice of the present invention. No particular limitation is imposed on the heat-removing capacity of the reflux condenser. The present invention is particularly effective in a steady state, that is, when it is applied to a reaction tank the temperature of which is controlled by the removal of heat through the reflux condenser while the present invention is being practised.

According to the present invention, it is possible to maintain the molecular weight of the resulting polypropylene at a constant level by introducing hydrogen in a volume corresponding to the volume of its consumption into the reaction tank, since the volume of hydrogen consumption required upon providing polypropylene of a constant molecular weight is uniform per unit weight and the vapor phase and liquid phase are maintained in equilibrium on average although the concentration of hydrogen in the vapor phase of the reaction tank varies depending upon the load to the reflux condenser and its apparent value changes considerably.

The present invention is extremely valuable from the industrial viewpoint because polypropylene of a constant molecular weight can be obtained with not only high efficiency but also good controllability by using a reaction tank equipped with a reflux condenser and conducting bulk polymerization of propylene in the presence of hydrogen as a molecular weight modifier in accordance with the process of this invention.

EXAMPLES

Continuous bulk polymerization of liquid propylene was conducted at 70° C. in the presence of a catalyst composed of titanium trichloride and diethylaluminum chloride in a reaction tank having the structure shown in FIG. 1 and an internal capacity of 40 m$^3$ while using the liquid propylene as a medium.

Upon initiation of the polymerization, 3000 kg of propylene and 35 Nm$^3$ of hydrogen were first charged in the reaction tank. Warm water was caused to flow through the jacket so as to heat the medium up to 70° C. The polymerization reaction was then initiated while charging the catalyst and propylene at constant feed velocities (titanium trichloride: 1.0 kg/hr, diethylaluminum chloride: 16 kg/hr, propylene: 10000 kg/hr). During the reaction, the reaction slurry was sampled from the reaction tank and the molecular weight of the resultant polypropylene was measured. The thus-measured molecular weight was compared with a predetermined value. The molecular weight of the resulting polypropylene was adjusted substantially to the predetermined value by repeating several times a fine correction procedure in which a small amount of hydrogen was charged in the reaction tank on the basis of the results of the above comparison. About 30 minutes were spent until the predetermined value was reached.

Continuous bulk polymerization of propylene was then conducted in accordance with the process of this invention. Namely, propylene, titanium trichloride and diethylaluminum chloride were charged at constant feed velocities, namely, at 6000 kg/hr, 0.8 kg/hr and 8 kg/hr respectively into the reaction tank. At the same time, a slurry was charged out at about 6000 kg/hr from the reaction tank so as to maintain the level of the slurry constant in the reaction tank. During this polymerization, data signals a,b,c,d were input from the detectors 4-1,4-2,4-4,4-5 into the data processor 8 to calculate the quantity of heat removed through the jacket and reflux condenser. It was found to be 860 Mcal/hr. Furthermore, upon its correction by the quantity of heat released from the system, the quantity of polymerization reaction heat generated in the reaction tank was 1,006

Mcal/hr, which corresponded to a polymerized propylene amount of 2,196 kg/hr.

The intrinsic viscosity corresponding to polypropylene of a desired molecular weight as measured in the form of its tetralin solution of 135° C. was found to be 1.73 and the volume of hydrogen required corresponding to the above-determined polymerized propylene amount was found to be 1.152 $Nm^3/hr$ from FIG. 2. A correction was performed in view of the volume of the hydrogen discharged along with the slurry from the reaction tank which volume was 0.845 $Mn^3/hr$. As a consequent, hydrogen was introduced into the reaction tank at the rate of 1.997 $Nm^3/hr$ through the flow rate regulating valve 4-3. By the way, the above operation, conversion and correction were all performed automatically by the data processor, and the system was operated in such a way that the molecular weight of the polypropylene in the discharged slurry was automatically controlled by delivering the volume of hydrogen, which was to be introduced, as the signal e to the flow rate regulating valve 4-3.

The polymerization reaction was continued while correcting the volume of hydrogen, which was to be introduced, at intervals of five minutes in accordance with variations of the data signals a,b,c,d. Two hours later, the volume of the polymerized propylene reached 2,405 kg/hr. At that point of time, the charging rate of hydrogen was 1.323 $Nm^3/hr$ and the intrinsic viscosity of the polymer sampled out from the discharged slurry as measured in the form of its tetralin solution of 135° C. was 1.73 as desired.

Figure 3:
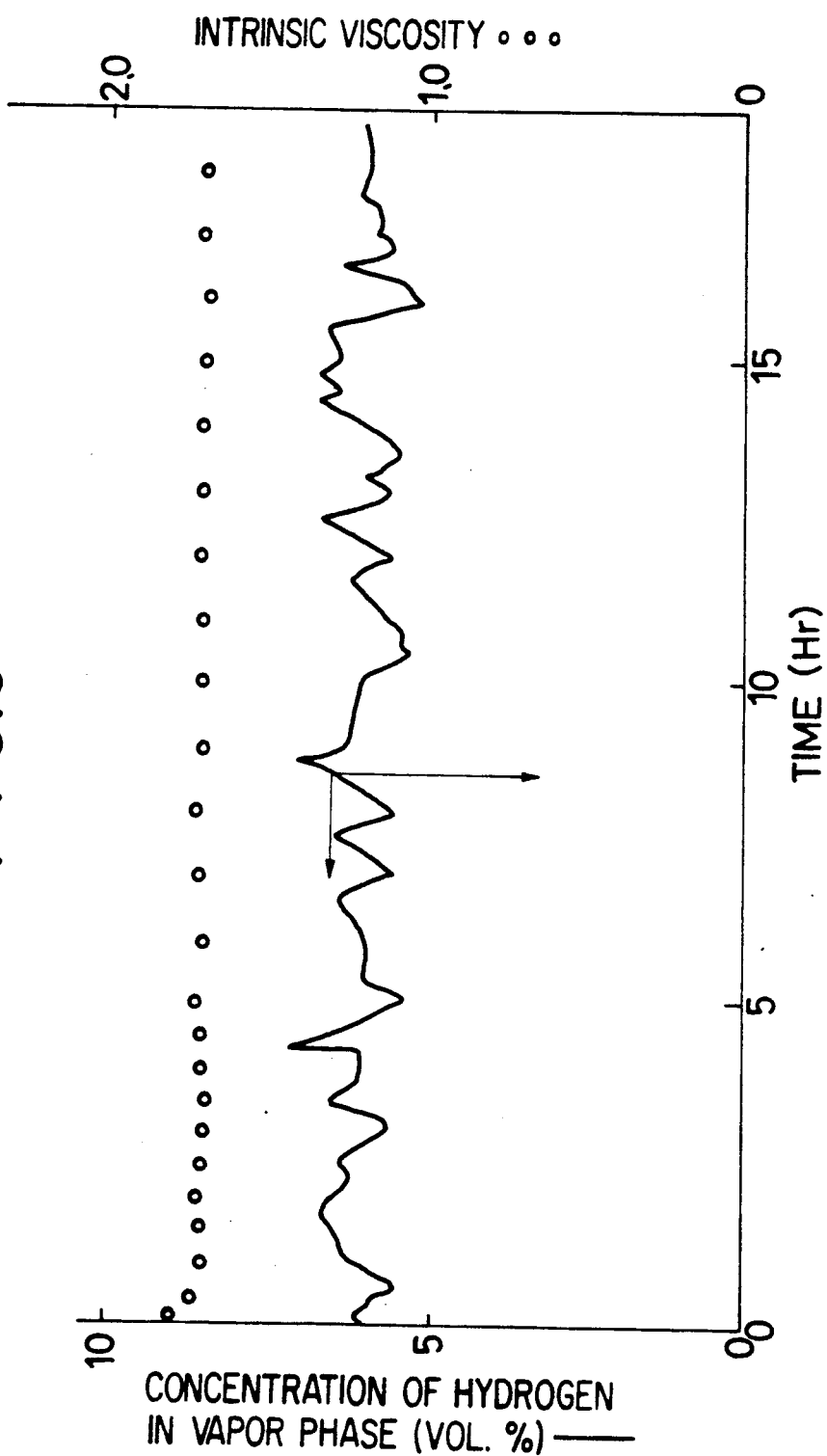
FIG. 3 is a diagrammatic representation of the relationship between the reaction time periods in Examples and the concentrations of hydrogen in the reaction vessels and the intrinsic viscosities of the resulting polymers.

The above reaction was continued for about 20 hours. FIG. 3 diagrammatically illustrates time-dependent variations in the concentration (vol. %) of hydrogen in the vapor phase sampled out through the line 9 as well as time-dependent variations in the intrinsic viscosity of polypropylene in the slurry discharged through the line 6. As understood from FIG. 3, the intrinsic viscosity, namely, the molecular weight was controlled at a constant level although the concentration of hydrogen in the vapor phase varied.

By the way, about 65% of the total quantity of heat removed through the jacket and reflux condenser in a steady state, namely, during the practice of the process of this invention was accounted for on average by reflux condenser.

What is claimed is:

1. A process for the preparation of a propylene homo- or co-polymer by subjecting propylene, or a mixture of propylene and another α-olefin copolymerizable with propylene, as a monomer or monomer mixture to bulk polymerization at a constant temperature, in the presence of hydrogen used as a molecular weight modifier, in a reaction tank equipped with a reflux condenser while using the propylene or mixture itself as a liquid medium and condensing vapor of the medium in the reflux condenser so as to remove at least a part of polymerization heat, which process consists of:

(a) measuring only the heat balance of the reaction tank in calculating the quantity of polymerization reaction heat generated in the reaction tank based on said measurement, not using detectable information of the concentration of hydrogen in the vapor phase of the reaction tank at all in this calculation and the following calculations and determinations, and calculating the amount of the monomer or monomer mixture polymerized in the reaction tank based on the thus-calculated quantity;

(b) determining in advance the relationship between molecular weights and volume of hydrogen consumption required for the molecular weights with respect to propylene homo- or co-polymer;

(c) determining the volume of hydrogen consumption required per unit amount of propylene alone or the mixture of propylene with another α-olefin copolymerizable with propylene corresponding to a desired molecular weight of propylene homo- or co-polymer; and (d) reacting the monomer or monomer mixture while controlling the volume of hydrogen, which is to be fed into the reaction tank, in accordance with variations in the volume of hydrogen required in the reaction tank as a product of the volume of required hydrogen consumption and the above-calculated amount of the monomer or monomer mixture.

2. The process as claimed in claim 1, wherein propylene is used as a sole monomer.

3. The process as claimed in claim 1, wherein said α-olefin polymerizable with propylene is at least one α-olefin selected from the group consisting of ethylene, 1-butene and 1-hexane.

4. The process as claimed in claim 1, wherein said α-olefin polymerizable with propylene is used in an amount of up to about 40% by weight of the polymerization mixture.

* * * * *